(12) United States Patent
Lansbergen et al.

(10) Patent No.: US 7,524,523 B2
(45) Date of Patent: Apr. 28, 2009

(54) OIL IN WATER EMULSION

(75) Inventors: Gabriel Jacobus Lansbergen, Wassenaar (NL); Theodorus Stam, Vlaardingen (NL)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 633 days.

(21) Appl. No.: 10/538,186

(22) PCT Filed: Nov. 7, 2003

(86) PCT No.: PCT/EP03/12503

§ 371 (c)(1), (2), (4) Date: Jun. 9, 2005

(87) PCT Pub. No.: WO2004/052114

PCT Pub. Date: Jun. 24, 2004

(65) Prior Publication Data

US 2006/0188634 A1 Aug. 24, 2006

(30) Foreign Application Priority Data

Dec. 10, 2002 (EP) .................... 02080177

(51) Int. Cl.
*A23D 7/00* (2006.01)
(52) U.S. Cl. ...................... 426/602; 426/601
(58) Field of Classification Search ........... 426/602
See application file for complete search history.

(56) References Cited

U.S. PATENT DOCUMENTS

| | | | |
|---|---|---|---|
| 4,341,677 A | 7/1982 | Tamosauskas | |
| 4,431,554 A | 2/1984 | Baur | |
| 4,610,889 A | 9/1986 | Schmidt | |
| 4,766,004 A | 8/1988 | Moskowitz | |
| 4,771,094 A | 9/1988 | Romberger | |
| 4,791,000 A | 12/1988 | Holemans et al. | |
| 4,810,407 A | 3/1989 | Sandvick | |
| 4,846,986 A | 7/1989 | Trivett | |
| 5,587,195 A | 12/1996 | Sassen | |
| 6,312,752 B1 * | 11/2001 | Lansbergen et al. | 426/607 |
| 7,108,888 B2 * | 9/2006 | Floeter | 426/603 |

FOREIGN PATENT DOCUMENTS

| | | |
|---|---|---|
| EP | 0291303 A2 | 11/1988 |
| EP | 0321227 A2 | 6/1989 |
| EP | 0322027 | 6/1989 |
| EP | 0526980 A1 | 2/1993 |
| EP | 0530864 A1 | 3/1993 |
| EP | 0521549 A1 | 7/1993 |
| EP | 0509579 B1 | 12/1994 |
| EP | 0724835 A1 | 8/1996 |
| EP | 0739592 A1 | 10/1996 |
| EP | 0682477 B1 | 4/1997 |
| EP | 0824869 A1 | 2/1998 |
| EP | 0948898 A2 | 10/1999 |
| EP | 1025763 A1 | 8/2000 |
| EP | 0691080 B1 | 11/2001 |
| GB | 1 504 027 | 3/1978 |
| JP | 52078204 | 7/1977 |
| WO | WO 94/10237 | 5/1994 |
| WO | WO 96/14756 | 5/1996 |
| WO | WO 97/18320 | 5/1997 |
| WO | WO 01/41586 A1 | 6/2001 |

OTHER PUBLICATIONS

International Search Report on International Application No. PCT/EP 03/12503 dated Jun. 4, 2004.
European Search Report Application No. EP 02 08 0177 dated Feb. 25, 2003.
Haahr et al., "Flavour release of aldehydes and diacetyl in oil/water systems", Food Chemistry, Apr. 21, 2000, pp. 355-362, XP-002273824.
JP55148056A, XP-002273826 (Abstract).
JP58212752A, XP-002273827 (Abstract).
JP53026803A, XP-002273825 (Abstract).
Patent Abstracts of Japan, Publication No. 55148055; Nov. 1980 (European Patent Office).

* cited by examiner

*Primary Examiner*—Carolyn A Paden
(74) *Attorney, Agent, or Firm*—Gerard J. McGowan, Jr.

(57) ABSTRACT

Non-dairy creams that comprise a mixture of triglyceride compositions, having a large variety in fatty acid and triglyceride compositions contained in the mix show improved storage stability and whipping performance. The complex mixtures of triglycerides are preferably obtained via interesterification.

20 Claims, No Drawings

OIL IN WATER EMULSION

FIELD OF THE INVENTION

The invention relates to oil in water emulsions that are suitable for use as non-dairy creams.

BACKGROUND TO THE INVENTION

Water continuous emulsions containing from about 5 to 40 wt % fat are known in the art. Such emulsions are generally known as creams. The best known example of a cream is dairy cream. Dairy cream generally comprises about 40 wt % fat and is suitable for use as a cooking cream, a whippable cream or a coffee cream.

Over the years, in order to improve the nutritional value and health aspects of creams, dairy fat has been (partly) replaced by vegetable fats. Creams wherein at least part of the dairy fat has been replaced by a vegetable fat are referred to as non-dairy creams (NDC). Non-dairy creams are for example disclosed in EP-A-509579 which describes non-dairy creams based on liquid oils. The art has shown that the replacement of dairy fat with (generally more soft) vegetable fats may lead to a deterioration of some product properties such as whip time, firmness after whipping, post hardening after whipping and storage stability of the product. These problems have been addressed in the art.

EP-A-682477 discloses low SAFA cream alternatives comprising a particular fat mixture which is a combination of fat A which is high in SAFA (saturated fatty acid) and fat B which is high in PUFA (polyunsaturated fatty acid).

EP-A-691080 discloses the use of a food-acceptable salt derived from a multivalent metal or alkaline earth metal to improve the properties of a non-dairy cream.

JP 52078204 discloses compositions comprising 45% fat and rather soft fats which result in fluffy creams after whipping.

Although the above described products may offer some product improvement, the known non-dairy creams are still not showing the desired combination of good whipping behaviour, limited post hardening after whipping, limited or no thickening while packed, limited sensitivity to temperature cycling and storage and relatively low levels of saturated fatty acids.

It is an object of the invention to provide products that show this desired combination of product properties.

SUMMARY OF THE INVENTION

We have surprisingly found that a mixture of triglyceride compositions, having a large variety in fatty acid and triglyceride compositions contained in the mix, leads to non-dairy cream products fulfilling these objectives.

Therefore the invention relates to an oil in water emulsion comprising emulsifier, and 5 to 40 wt % fat wherein the fat is characterised by a ratio of $H_2U$ (triglycerides of 2 saturated fatty acids with chain length of at least 16 carbon atoms and one cis-unsaturated fatty acid) in weight % on total fat divided by $HM_2$ (triglycerides of one saturated fatty acid with chain length of at least 16 carbon atoms and two saturated fatty acids with chain length of 10 to 14 carbon atoms) in weight % on total fat, plus $H_2M$ (triglycerides of two saturated fatty acid with chain length of at least 16 carbon atoms and one saturated fatty acid with chain length of 10 to 14 carbon atoms) in weight % on total fat, is from 0.25 to 3.

DETAILED DESCRIPTION OF THE INVENTION

In the context of the invention the terms "fat" and triglyceride are used interchangeably.

Triglycerides are molecules of glycerol esterified to 3 fatty acid residues. Triglycerides are characterised by their fatty acid composition and distribution over the 3 glycerol-ester positions.

The following abbreviations are used for fatty acids:

H means saturated fatty acid of 16 carbon atoms or longer (C16+ e.g. up to 24).

U means unsaturated fatty acid of any chain length, mono or polyunsaturated in cis-conformation.

E means unsaturated fatty acid in trans conformation. Trans level may be determined according to AOCS official method Ce 1f-96.

M means saturated fatty acid of 10-14 carbon atoms.

The fatty acid composition of triglycerides is given for example by:

$H_2U$: triglycerides of 2 saturated fatty acids with chain length at least 16 carbon atoms and one cis-unsaturated fatty acid.

$M_3$: triglycerides of three saturated fatty acids with chain length of 10 to 14 carbon atoms.

For the purpose of the invention, triglycerides comprising at least 20 wt %, preferably at least 30 wt % fatty acids with 12 carbon atoms (C12) on total fatty acid weight, are defined as "laurics". Examples of laurics are coconut oil, palm kernel oil, babassu oil or derivatives thereof.

The fat compositions of the invention are characterised by the fatty acid composition of the triglycerides.

The invention relates to oil in water emulsions. These emulsions are preferably spoonable or pourable. Pourable means that the emulsion is a liquid (rather than a paste) and that it can be removed from its container by tilting the container, whereby the emulsion flows out. Suitably, the emulsion will have a viscosity in the range of 0.1 to 40 dPa·s (deci-Pascal·s) when measured with a Haake viscosimeter type VT02, measured with head No.3, in measure beaker with 5 cm diameter at a temperature of 5 or 10° C., measured after a few seconds when value is about constant, rotation speed being 62.5 rotations per minute (rpm). The measurement is to be carried out 3 days after preparation of the emulsion and storage at 5° C.

Preferably pourable creams have a viscosity of from 0.1 to 30 dPa·s, more preferred from 1 to 30 dPa·s, most preferred from 1 to 20 dPa·s.

Spoonable products are for example described in EP-A-691080.

The oil in water emulsion is also referred to as cream, whippable cream or non-dairy cream. Preferably the creams are whippable.

The products according to the invention comprise a fat. The composition of the fat fulfils the requirement $H_2U/(HM_2+H_2M)$ is from 0.25 to 3, to ensure product stability and to reduce the thickening of the product on storage at constant temperature or at temperature cycling. Furthermore such fat contributes to the desired whippability and to ensure that products do not suffer from post hardening.

In the context of the invention, preferred products are whippable under conditions presented in the examples within 5 minutes, preferably within 4 minutes.

Post hardening is the increase of product hardness of a whipped product. This leads to products with a perceivable thickness/hardness, which is not desired. The method to determine post hardening is described in the examples. Preferably post hardening in terms of increase of Stevens value at about 10° C. is less than 20%.

According to the invention the ratio $H_2U/(HM_2+H_2M)$ is from 0.25 to 3, preferably 0.3 to 3.0, more preferably from 0.3 to 2, even more preferred from 0.35 to 1, most preferred from 0.5 to 0.80.

Products that show reduced ratio (below 0.25) of $H_2U/(HM_2+H_2M)$ were found to show post hardening levels of more than 50%. Also these products often were thickening on storage, especially if temperature cycling was applied. Temperature cycling is the storage of a product at 5 and 25° C. alternating whereby the product is at each temperature for at least 1 day.

According to a preferred embodiment the ratio of $H_2U/M_3$ is at least 0.3, preferably at least 0.5, more preferably at least 0.6, even more preferred at least 0.7, even most preferred at least 0.9. Even more preferred the ratio of $H_2U/M_3$ is at most 10, preferably at most 5. Products that do not meet this requirement were found to show undesired levels of post hardening.

According to another embodiment, the ratio of $H_2U/M_3$ is from 0.5 to 10.

According to another preferred embodiment, the fats are chosen such that the level of $H_2M$ plus $HM_2$ is at least 20 wt % on total weight of triglycerides, preferably from 20 to 25 wt % on total weight of triglycerides.

According to another preferred embodiment, the amount of laurics is from 20 to 60 wt % on total fat. Higher levels than 60 wt % of laurics often lead to products with undesired product properties. It is preferred that the amount of laurics is from 30 to 60 wt %, more preferred from 40 to 60 wt % on total fat.

Preferably the amount of $H_2U$ is from 5 to 20, more preferably from 6 to 12 wt % on total fat.

The emulsion is suitable for all type of use such as cooking, topping, whipping. For many of its applications the product is consumed as such or after whipping. It is important that the products have a good mouth feel and melting properties on eating them to make them suitable for these applications. The melting properties and mouth feel are largely determined by the solid fat content of the fat at consumption (in mouth) temperature. The higher the solids level around 37° C., the more waxy the products taste and the longer it takes for them to create a pleasant melting sensation (which is e.g. achieved when chocolate is consumed). Therefore in a preferred embodiment the solid fat content of the fat at 35° C. is at most 10%, preferably at most 8%, more preferred at most 5%, even more preferred at most 4%. The method to determine the solid fat content of a fat (blend) at a certain temperature is described in the examples. The pretreatment of the fat has an impact on the solid fat content measured. Therefore these measurements are performed on fats that have been subjected to the following temperature regime:

melt fat at 80° C.
5 minutes at 60° C.
60 minutes at 0° C.

30-35 minutes at each chosen measuring temperature

The solid fat content was found to influence the whipping and storage product properties as well. Suitable fats preferably have a solid fat content at 10° C. of at least 50%, preferably at least 55%, more preferred from 60 to 70%. Lower levels were found to increase the whip time.

The fat in the emulsions according to the invention is preferably derived from vegetable fat and/or fish oil. The presence of butter fat is tolerable but less preferred because of it's price and because the products are preferably referred to as non-dairy creams. Therefore preferred products contain less than 10 wt % butter fat on total fat. This level refers to added butter fat and does not include butter fat that may be present in other ingredients such as butter milk powder.

Preferably the fat is selected from the group comprising palm oil, palm kernel oil, bean oil, rapeseed oil, coconut oil, sunflower oil and combinations thereof.

The fats may be derived from vegetable or fish oil without further treatment but optionally the oil is hydrogenated, interesterified or treated otherwise before use.

Partial hydrogenation is preferably avoided or carried out such that the resulting level of trans-unsaturated fatty acids is kept to a minimum. Preferably in products according to the invention the level of trans-fatty acids (E) is less than 5 wt % of total fat, more preferred less than 3 wt % on total fat, most preferred essentially absent (less than 1 wt % trans fatty acid on total fat).

Without wishing to be bound by any theory applicants believe that the benefits of the claimed fats are partly due to the fact that the claimed compositions are mixtures of triglycerides comprising a broad variety of fatty acids and a broad variety of final triglyceride compositions. Such compositions are e.g. obtainable by interesterification of triglyceride mixtures. Therefore it is preferred that the fats at least partly consist of interesterified mixtures of triglycerides, which are optionally combined with non-esterified fats.

Especially suitable are interesterified mixtures where the H-supplier is palm oil or palm oil stearine, which is esterified with laurics such as coconut oil. It will be appreciated however that the requirements of the fat according to the invention may be fulfilled by a variety of triglyceride combinations which may be determined by a skilled person on the basis of his general knowledge provided he follows the guidance provided in this patent specification and examples.

To improve stability and whippability, the emulsions comprise an emulsifier. The emulsifier may be selected from any of the suitable emulsifiers e.g. lecithin, monoglycerides, diglycerides, citric acid (ester), lactic acid ester, polysorbate monostearate or combinations thereof.

The presence of unsaturated monoglycerides was found to positively influence whipping behaviour.

Therefore in a preferred embodiment the oil in water emulsion comprises monoglycerides in an amount of from 0.2 to 0.5 wt % on total emulsion weight.

The emulsions optionally comprise further ingredients that are common for creams. Examples of such ingredients include, but are not limited to the following.

Proteins are often added to improve mouthfeel and taste of the products. Suitable proteins are for example derived from milk or cream such as skim milk (powder), butter milk (powder). Suitable amounts of protein are from 0.5 to 5 wt %.

Thickeners are optionally added to improve the product stability. The thickener is preferably selected from the group comprising guar gum, carrageenan, xanthan gum, starch or a combination thereof.

If added, the amount of thickener is preferably from 0.001 to 2 wt %, more preferred from 0.1 to 0.8 wt %.

Optionally the products comprise a sugar, e.g. glucose, insulin or dextrose. Such sugar is especially preferred for whipping creams.

The emulsions further may contain flavour or colouring agents such as carotenoids.

Cooking creams may optionally contain some salt such as sodium chloride.

The emulsions may have any pH between 3 and 8. It is preferred that the emulsions are neutral creams.

The emulsions may be prepared by any suitable process. For example the process includes the steps of mixing all ingredients, sterilisation, e.g by heating to about 120 to 150° C., homogenisation, cooling and filling into packaging material.

Reference is also made to WO-A-01/41586 and EP-A-691080 which disclose suitable processes for preparing oil in water emulsions.

The invention is illustrated by the following examples.

General

General Methods

1. Viscosity determination

Viscosity (dPa·s) is determined as shear stress/shear rate by the Haake method.

Haake viscosimeter type VT02 was used supplied with head No.3, in measure beaker with diameter of 5 cm at a temperature of 5 or 10° C. The viscosity was measured after a few seconds once the reading was constant, at a rotation speed of 62.5 rotations per minute (rpm). The measurement is to be carried out after 3 days storage at 5° C.

2. Measurement of hardness/post hardening

Apparatus used: Stevens Texture Analyser model LFRA
Probe used: plastic cylinder with diameter of 1 inch
Settings of the Stevens Texture analyser:
Penetration depth: 4 mm
Penetration speed: 0.5 mm/sec
The hardness value is determined in grams/cm².
The temperature is 10° C.
Post hardening is determined after the product has been whipped to a maximum SV in about 3 to 4 minutes. The % post hardening is the absolute difference between the Stevens value of the whipped product at 10° C. immediately after whipping and 1 day after whipping on storage at 10° C. divided by the Stevens value immediately after whipping.

3. Whipping performance

A Kenwood chefKM300™ mixer with a bowl of 4.4 l and a wire wisk is connected with a potentiometer. The mixer was operated at speed 6 (maximum of mixer is 7) with 270 to 300 g of emulsion.

270 to 300 grams of emulsion were added (5 to 10° C.) to the 4.4 liter bowl of the mixer with wire whisk attachment.

The emulsion is whipped at high speed (6) until the power input recorded with the potentiometer is at maximum. The time required to obtain an optimum in the resistance determined by the potentiometer is the whip time.

4. Determination of specific volume (S.V.)

The specific volume of the whipped emulsion was measured by filling a steel cup with known volume and weight and levelling the top. The weight of the filled cup was measured.

S.V. is the volume of the whipped emulsion in the cup divided by the weight of whipped emulsion in cup (ml/ g).

5. The solid fat content can be measured by a suitable analytical method such as NMR. The method used is low Resolution NMR with Bruker Minispec apparatus. Reference is made to the Bruker Minispec application notes 4,5 and 6. Solid fat measurements were done on fat blend only.

The percentage of solid fat determined by the low resolution NMR technique is defined as the ratio of the response obtained from the hydrogen nuclei in the solid phase and the response arising from all the hydrogen nuclei in the sample. The product of this ratio and one hundred is termed the low resolution NMR solids percent. No correction is made for variations in the proton density between solid and liquid phase. The NMR solids percent for a sample measured at t ° C. was given the symbol $N_t$.

Suitable instruments adapted to determine the solids fat content are the Bruker Minispecs p20i™, pc20™, pc120™, pc120s™, NMS120™ and MQ20™.

Stabilisation and tempering procedure was as indicated before:
melt fat at 80° C.
5 minutes at 60° C.
60 minutes at 0° C.
30-35 minutes at each chosen measuring temperature.

The solid fat content measurement as used herein is described in AOCS official method Cd 16b-93 (direct method, parallel NB: this method is different from the so called Solid fat Index (SFI), which is described in AOCS official method Cd 10-57.).

Process

Ingredients and amounts are as indicated in the Examples. The process for preparing was as follows.

An aqueous phase was prepared by heating water to 75° C.
Protein, sugar, gums, thickener or other ingredients were added.

The mixture was treated in an Ultra turrax™ for 5 minutes.
A fat phase was prepared by heating the fat blend to 75° C. Emulsifiers were added to the heated fat blend and the resulting mixture was stirred together with a blade stirrer for 5 minutes.

The fat phase and the aqueous phase as prepared above were mixed at 75° C. and subjected to treatment in an Ultra Turrax™ for at least 2 minutes until a homogeneous emulsion resulted. In further processing the resulting mixture (pre-mix) was pre-heated to 80° C. and subjected to direct steam injection to 142° C., while holding for 5 seconds. The resulting mixture was flash cooled to 80° C. and homogenised in one step at 200 Bar (1 step in a APV Gaulin homogeniser). The mixture was then cooled to 10° C. and filled aseptically in sterile glass jars. Storage was at 5° C.

The general cream composition was as follows:

| | Amount in wt % |
|---|---|
| Fat blend | 20 |
| monoglycerides | 0.38 |
| Skim milk powder and butter milk powder | 5.25 |
| Guar gum Edicol 60/70 | 0.075 |
| Kappa carrageenan | 0.01 |
| Locust bean gum | 0.04 |
| Water | Up to 100 |

The fat blend was varied for examples 1-4

| Fat blend | 1 comparative | 2 | 3 | 4 |
|---|---|---|---|---|
| Rapeseed oil CN | | 10 | | 20 |
| Palm kernel oil | 25 | | | 10 |
| Interest blend of 60 wt % palm oil and 40 wt % palm kernel oil | 50 | 70 | 75 | |

-continued

|  | | | | |
|---|---|---|---|---|
| Interest blend of 60% palm oil stearine and 40% coconut oil | | | 25 | 70 |
| Fully hardened Palm kernel oil (mp 39° C.) | 25 | 20 | | |
| N10 | 63.1 | 56.5 | 60.5 | 56 |
| N35 | 1.0 | 2.3 | 3.7 | 4 |
| $H_2U/HM_2 + H_2M$ | 0.22 | 0.33 | 0.5 | 0.35 |
| $H_2U/M_3$ | 0.35 | 0.99 | 3.69 | 1.5 |
| $H_3$ | 2.2 | 2.7 | 4.4 | 5.0 |
| $H_2M$ | 8.8 | 9.7 | 11.5 | 11.7 |
| $H_2U$ | 5.9 | 8.1 | 10.8 | 7.5 |
| $HM_2$ | 17.8 | 14.4 | 10.1 | 10.0 |
| $M_3$ | 16.7 | 8.1 | 2.9 | 5.2 |
| Laurics (wt on total fat) | 70 | 48 | 40 | 38 |
| % Trans level | <1 | <1 | <1 | <1 |

|  | 1 | 2 | 3 | 4 |
|---|---|---|---|---|
| Results | | | | |
| Viscosity (dPas after 5° C. for 8 weeks) | 1.6 | 2 | 1.5 | 2 |
| Cycling stability | 80 dPa·s | 2 dPa·s | 1.5 | 2 |
| Viscosity after cycling 5/25/5° C. | | | | |
| Whip time (min) | 2 | 4 | 4 | 4 |
| SV | 2.84 | 3.31 | 3.65 | 3.13 |
| Post hardening at 10° C. (%) | Less than 5% | Less than 5% | Less than 5% | Less than 5% |
| Stevens value 10° C. of whipped cream (g) | 51 | 15 | 15 | 44 |

The invention claimed is:

1. Oil in water emulsion comprising emulsifier, and 5 to 40 wt % fat wherein the fat is characterized by a ratio of $H_2U$ (triglycerides of 2 saturated fatty acids with chain length of at least 16 carbon atoms and one cis-unsaturated fatty acid) in weight % on total fat divided by $HM_2$ (triglycerides of one saturated fatty acid with chain length of at least 16 carbon atoms and two saturated fatty acids with chain length of 10 to 14 carbon atoms) in weight % on total fat, plus $H_2M$ (triglycerides of two saturated fatty acids with chain length of at least 16 carbon atoms and one saturated fatty acid with chain length of 10 to 14 carbon atoms) in weight % on total fat, is from 0.25 to 3, said oil in water emulsion being a whippable cream.

2. Oil in water emulsion according to claim 1 wherein the fat is characterized by a ratio of $H_2U$ (triglycerides of 2 saturated fatty acids with chain length at least 16 carbon atoms and one cis-unsaturated fatty acid) in weight % on total fat, divided by $M_3$ (triglycerides of three saturated fatty acids with chain length of 10 to 14 carbon atoms) in weight % on total fat, of at least 0.3.

3. Oil in water emulsion according to claim 1 wherein $H_2U/(HM_2+H_2M)$ is from 0.3 to 3.

4. Oil in water emulsion according to claim 3 wherein $H_2U/(HM_2+H_2M)$ is from 0.3 to 2.

5. Oil in water emulsion according to claim 3 wherein $H_2U/(HM_2+H_2M)$ is from 0.5 to 0.80.

6. Oil in water emulsion according to claim 1 wherein the ratio of $H_2U/M_3$ is at least 0.5.

7. Oil in water emulsion according to claim 6 wherein the ratio of $H_2U/M_3$ is at least 0.7.

8. Oil in water emulsion according to claim 6 wherein the ratio of $H_2U/M_3$ is at least 0.9.

9. Oil in water emulsion according to claim 1 wherein the ratio of $H_2U/M_3$ is from 0.5 to 10.

10. Oil in water emulsion according to claim 1 wherein the amount of laurics is from 20 to 60 wt % on total fat.

11. Oil in water emulsion according to claim 10 wherein the amount of laurics is from 30 to 60 wt % on total fat.

12. Oil in water emulsion according to claim 10 wherein the amount of laurics is from 40 to 60% on total fat.

13. Oil in water emulsion according to claim 1 wherein the solid fat content of the fat at 35° C. is at most 10%.

14. Oil in water emulsion according to claim 13 wherein the solid fat content of the fat at 35° C. is at most 8%.

15. Oil in water emulsion according to claim 13 wherein the solid fat content of the fat at 35° C. is at most 4%.

16. Oil in water emulsion according to claim 1 wherein the solid fat content of the fat at 10° C. is at least 50%.

17. Oil in water emulsion according to claim 16 wherein the solid fat content of the fat at 10° C. is from 60 to 70%.

18. Oil in water emulsion according to claim 1 wherein the amount of $H_2U$ is from 5 to 20 wt % on total fat.

19. Oil in water emulsion according to claim 18 wherein the amount of $H_2U$ is from 6-12% on total fat.

20. Oil in water emulsion according to claim 1 wherein the emulsifier comprises monoglycerides in an amount of from 0.2 too 0.5 wt % on total emulsion weight.

\* \* \* \* \*